Patented Apr. 29, 1941

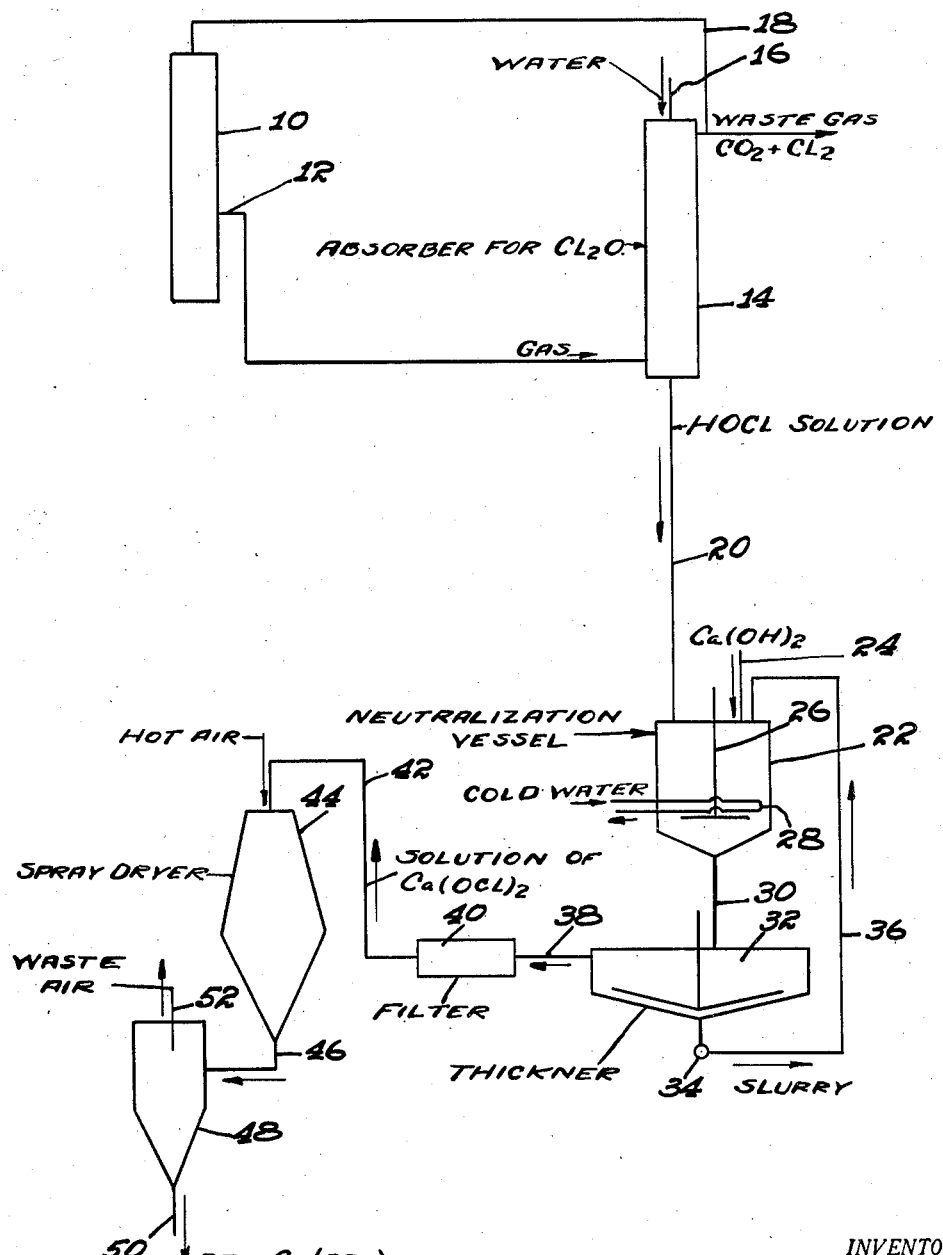

2,240,342

UNITED STATES PATENT OFFICE 2,240,342

MANUFACTURE OF CHLORINE COMPOUNDS

Irving E. Muskat, Akron, and George H. Cady, Wadsworth, Ohio, assignors to Pittsburgh Plate Glass Company, a corporation of Pennsylvania Application September 30, 1937, Serial No. 166,516

2 Claims. (Cl. 23—152)

This invention relates to a method of preparing hypochlorous acid. In accordance with the present invention, we have found that hypochlorous acid may be prepared in high concentration by treating a body of chlorine with a suitable agent such as sodium carbonate or bicarbonate or other oxygen carriers such as silver or mercuric oxide to convert only a portion of the chlorine into chlorine monoxide, whereby a mixture of chlorine and chlorine monoxide is secured. It is found that upon treatment of this mixture with a limited amount of water, the major part of the chlorine monoxide may be absorbed without substantial absorption of chlorine. This is particularly true when a diluent such as air or carbon dioxide is present. Thereafter, the unabsorbed chlorine may be recycled, if desired.

The preparation of the chlorine monoxide may, if desired, be effected by the process described in our copending application Serial No. 136,802, filed April 14, 1937 (now Patent No. 2,155,218) or may be prepared by other suitable methods. In the process described in that application chlorine monoxide is generated in dilution with air or in a solvent such as carbon tetrachloride, by passing chlorine in the desired medium into contact with mercuric oxide whereby a mixture comprising chlorine and chlorine monoxide is obtained. The resultant chlorine monoxide may be dissolved in water, to form a relatively concentrated solution of hypochlorous acid and thereby separated from the chlorine in the mixture. Preferably the absorption of chlorine monoxide is conducted at as low a temperature as is practicable. Room temperature may be employed, but by suitable refrigeration the temperature may be lowered approximately to zero degrees C., or lower.

Other methods of preparing chlorine monoxide by means of mercuric or silver oxide may also be used. Moreover, other agents may be used for preparation of chlorine monoxide. For example, our copending application for Letters Patent Serial No. 221,018, filed July 23, 1938, as well as the copending application of George H. Cady, Serial No. 190,618, filed February 15, 1938 (now Patent No. 2,157,524) describes a process wherein chlorine in admixture with air or in solution in carbon tetrachloride or in other convenient medium is caused to come in contact with a sodium carbonate or bicarbonate or similar alkaline agent in the presence of a limited quantity of water. In any case, a mixture comprising chlorine, chlorine monoxide and a diluent is generally obtained. The mixture of chlorine monoxide, chlorine, carbon dioxide and other gaseous constituents is especially suited for use in the present process. By contacting the gaseous mixture with water in accordance with the provisions of the present invention, the chlorine monoxide is absorbed to form hypochlorous acid and the diluent, elemental chlorine and other gases pass on and may be recycled for further conversion of chlorine into chlorine monoxide.

Where $CO_2$ is employed as a diluent the chlorine preferably constitutes about 7 to 20% of the mixture. To obtain the best possible yield of HOCl, based on the quantities of materials consumed, it is necessary that only a part of the $Cl_2$ be converted to $Cl_2O$. When soda ash is used as the "oxygen carrier," the fraction of the $Cl_2$ converted should be 50% or less. 20–25% conversion results in good operation. When mercuric oxide is used, the conversion may be much greater, for example 90%. Even in this case, however, it is undesirable to convert all of the $Cl_2$ to $Cl_2O$.

In the foregoing processes calcium or potassium carbonate may be substituted for soda ash and silver oxide or the like may be substituted for mercuric oxide.

In event that chlorine monoxide is prepared in solution in a solvent such as carbon tetrachloride in any of the foregoing processes, it may be selectively absorbed by contacting the carbon tetrachloride solution with water.

In a specific example of the modification of the invention in which gaseous chlorine is employed, a mixture of 648 parts by volume of carbon dioxide and 82 parts by volume of chlorine were humidified by bubbling through water at 16° C. This mixture of gases was then fed with agitation through a reaction chamber about 9 feet long at such speed that approximately 730 liters per hour of the mixture per 2.0 sq. inches of cross sectional area of the tube were passed. During flow of gases through the tube they contacted countercurrently a stream of dry soda ash flowing at a rate of 50 grams per hour. During reaction the atmospheric temperature around the reaction chamber was maintained at 30°±1° C. The gases which issue from the tube contained about 1.25 per cent of chlorine monoxide by volume and approximately 75 per cent of the chlorine originally present. The efficiency based upon chlorine consumption was 90 per cent.

Chlorine monoxide was recovered from the gaseous mixture by bubbling the latter through water at zero degrees C. A relatively concentrated solution of hypochlorous acid containing 196 grams of acid per liter with only small amounts of chlorine and chloric acid was thus obtained.

In a specific example of the process in which a liquid reaction medium is employed, 18.9 grams of soda ash containing 10.1 per cent of water as water of crystallization were stirred vigorously for 4 minutes with 350 cc. of a solution of chlorine in carbon tetrachloride having a dissolved chlorine content of 73.5 grams per liter. Approximately 7.6 grams of chlorine monoxide were produced with a yield based upon the chlorine consumption of about 90 per cent. The reaction was discontinued at the end of the 4 minute period in order to prevent further reaction of the chlorine monoxide dissolved in the carbon tetrachloride with the spent soda ash.

The chlorine monoxide in the carbon tetrachloride may be recovered as a concentrated solution of hypochlorous acid by selective solution in water. In a specific example of such a process, a solution containing 62.4 grams of chlorine monoxide and 7.0 grams of chlorine per liter was shaken with 0.557 times its volume of water. The two liquids were then separated and the aqueous phase was found to contain 92% of the chlorine monoxide as hypochlorous acid. Only 3.7% of the chlorine was absorbed. This aqueous solution of hypochlorous acid was then mixed with hydrated lime to produce calcium hypochlorite.

A suitable embodiment of apparatus for use in practice of the invention is disclosed in the drawing and comprises a vessel or chamber 10 for the generation of chlorine monoxide in accordance with the present process, for example, by reaction of chlorine with an oxygen carrier such as mercuric oxide, silver oxide, soda ash or sodium bicarbonate. The chlorine monoxide is discharged from the reaction vessel through a conduit 12 and is passed in at the base of a suitable absorption tower 14, and flows through the latter countercurrently to a descending stream of water which enters from conduit 16, at or near the top of the tower. As a result of contact of the chlorine monoxide in this tower with the water, the chlorine monoxide is absorbed to form a solution of hypochlorous acid. By such a method it is possible to form solutions of 5, 10, 15, or even higher percentages of hypochlorous acid. Any unabsorbed gas leaving the absorption tower consists essentially of unreacted chlorine, together with air, carbon dioxide, or other diluent. The mixture is recycled through the conduit 18 to the reaction chamber 10, where in admixture with additional amounts of chlorine it is treated to form further quantities of chlorine monoxide. Manifestly, the tower 14 may be replaced by any other convenient form of apparatus for obtaining contact between the chlorine monoxide and the water.

The acid obtained in accordance with this process is unusually high in concentration and is very pure. While hypochlorous acid ordinarily is considered to be very unstable the present solution retains its active chlorine content over long periods of time. The acid thus prepared is particularly valuable in the preparation of calcium hypochlorite of high active chlorine content. Thus, where commercial calcium hypochlorite contains only about 70 percent of active chlorine, it is possible to secure calcium hypochlorite having an active chlorine content as high as 90 percent or more by neutralization of the acid with calcium hydroxide and evaporation of the solution. As illustrated in the drawing, the hypochlorous acid solution from the absorption tower may be discharged through conduit 20 into a so-called neutralizing vessel 22. The latter has provided near the top thereof an inlet conduit 24 for hydrated lime which may be in dry or slurry form as preferred. The neutralization vessel is also equipped with an agitator 26 for purposes of obtaining thorough contact between hydrated lime and the hypochlorous acid. Since the reaction is exothermic it may be desirable to equip the reaction vessel with a coil 28 through which a cooling medium may be circulated. The product of reaction consisting of unreacted lime in the form of a slurry, or sludge, and a solution of calcium hypochlorite are discharged from the bottom of the neutralization vessel through conduit 30 into a conventional thickening apparatus 32, in which the lime sludge is concentrated and is then impelled by means of a pump 34 through a conduit 36 back to the neutralization vessel 22. The solution of calcium hypochlorite, together with some suspended material, is discharged from the thickener through conduit 38 into a filter 40 where the remainder of the suspended matter is taken out, after which the solution passes through conduit 42 into a suitable drier 44 for concentration or evaporation to dryness as may be desired. The drier may be a vacuum evaporator, a spray drier, or any other suitable device. If a spray drier of the type illustrated is used evaporation is effected by a current of hot air or other heated gaseous medium which is simultaneously discharged into the drying chamber. The mixture of dry calcium hypochlorite and air discharges from the bottom of the drier through conduit 46 into a suitable separator apparatus 48, in which the dry and pulverulent calcium hypochlorite is separated from the air and discharged from the bottom of the apparatus through conduit 50. The hot waste air from the drying operation is discharged from the separator at the top thereof through conduit 52 and may be passed to waste, or if it is of sufficiently high temperature to warrant heat recovery, it may be passed through a heat exchanger for purposes of heating the incoming drying air, or for purposes of supplying heat in any other desired operation.

By employment of the foregoing process it is possible to obtain calcium hypochlorite in a highly stable and highly concentrated form. Moreover, the present invention also provides a highly convenient method and apparatus for preparing hypochlorous acid in high concentration. This acid will be especially suited for manufacture of calcium hypochlorite, or other hypochlorites. It may also be employed as such in bleaching operations, or in various types of chemical reactions for which hypochlorous acid may be suitable.

The method and apparatus herein disclosed as being suitable for use in practicing the present invention are to be considered merely as exemplary. Manifestly, numerous modifications may be made therein without departure from the spirit of the invention, or the scope of the appended claims.

What we claim is:

1. A process of preparing hypochlorous acid which comprises contacting chlorine with an oxide of a metal of the group consisting of mercury and silver for a time sufficient to convert only a portion of the chlorine into chlorine monoxide thereby producing a mixture containing substantial amounts of chlorine and chlorine monoxide, contacting the mixture with an amount of water sufficient to absorb a substantial amount of chlorine monoxide without substantial absorption of chlorine and recycling at least a portion of the chlorine to form more chlorine monoxide.

2. A process of preparing hypochlorous acid which comprises contacting chlorine with an oxide of a metal of the group consisting of mercury and silver for a time sufficient to convert only a portion of the chlorine into chlorine monoxide thereby producing a mixture containing substantial amounts of chlorine and chlorine monoxide, contacting the mixture in the presence of a diluent gas with an amount of water sufficient to absorb a substantial amount of chlorine monoxide without substantial absorption of chlorine and recycling at least a portion of the chlorine to form more chlorine monoxide.

IRVING E. MUSKAT.
GEORGE H. CADY.